US012698059B2

(12) United States Patent
Morin et al.

(10) Patent No.: US 12,698,059 B2
(45) Date of Patent: Aug. 4, 2026

(54) AUTONOMOUS WATERCRAFT RACE COURSE SYSTEM

(71) Applicant: ROBOBUOY INC., Detroit, MI (US)

(72) Inventors: Kevin J. Morin, Detroit, MI (US); Matthew P. Morin, Detroit, MI (US)

(73) Assignee: ROBOBUOY INC., Detroit, MI (US)

( * ) Notice: Subject to any disclaimer, the term of this patent is extended or adjusted under 35 U.S.C. 154(b) by 543 days.

(21) Appl. No.: 17/917,465

(22) PCT Filed: Oct. 8, 2021

(86) PCT No.: PCT/US2021/054118
§ 371 (c)(1),
(2) Date: Oct. 6, 2022

(87) PCT Pub. No.: WO2022/076785
PCT Pub. Date: Apr. 14, 2022

(65) Prior Publication Data
US 2023/0339577 A1     Oct. 26, 2023

Related U.S. Application Data

(60) Provisional application No. 63/089,049, filed on Oct. 8, 2020.

(51) Int. Cl.
| | |
|---|---|
| *B63B 22/16* | (2006.01) |
| *B63B 22/18* | (2006.01) |
| *B64U 80/84* | (2023.01) |
| *B64U 101/30* | (2023.01) |
| *G05D 1/00* | (2024.01) |
| *H04W 4/40* | (2018.01) |

(52) U.S. Cl.
CPC .............. *B63B 22/16* (2013.01); *B63B 22/18* (2013.01); *B64U 80/84* (2023.01); *G05D 1/00* (2013.01); *G05D 1/0208* (2013.01); *H04W 4/40* (2018.02); *B64U 2101/30* (2023.01)

(58) Field of Classification Search
CPC .......... B63B 22/16; B63B 22/18; B64U 80/84
See application file for complete search history.

(56) References Cited

U.S. PATENT DOCUMENTS

| | | | | |
|---|---|---|---|---|
| 5,689,475 A | * | 11/1997 | Chaumet-Lagrange | ..................... B63B 35/00 367/88 |
| 2003/0007795 A1 | * | 1/2003 | Grober | ................... F16M 13/02 396/55 |
| 2008/0278314 A1 | * | 11/2008 | Miller | ................... G07C 5/008 340/323 R |
| 2015/0254910 A1 | * | 9/2015 | Summers | ............. G01C 21/203 701/31.5 |

(Continued)

*Primary Examiner* — Erin M Piateski
*Assistant Examiner* — Gabriel Joseph Rene Lambert
(74) *Attorney, Agent, or Firm* — Butzel Long; Gregory Ozga

(57) ABSTRACT

An autonomous watercraft race course system using automated buoys, sensors, and a race course application for autonomously setting up, starting, conducting, and scoring a race. The race can be any type of race conducted on or near water. In a preferred embodiment the race is a sailing race, however, it is within the scope of this invention for the race to include races for power boats, personal water craft (i.e., jet ski), waterskiing, wake boarding or surfing and over water aircraft races.

22 Claims, 6 Drawing Sheets

(56) References Cited

U.S. PATENT DOCUMENTS

2016/0378107 A1* 12/2016 Morin .................. G05D 1/0044
                                        701/2
2017/0328345 A1* 11/2017 Grober ...................... G01P 5/00
2018/0023954 A1*  1/2018 Rivers ...................... G08G 3/02
                                        701/21
2022/0004761 A1*  1/2022 Biancale .................. G06T 7/55

* cited by examiner

AUTONOMOUS WATERCRAFT RACE COURSE SYSTEM

CROSS-REFERENCE TO RELATED APPLICATIONS

This application is a PCT International Application and claims benefit of U.S. Provisional Patent Application No. 63/089,049; filed Oct. 8, 2020. The disclosure of the above application is incorporated herein by reference.

FIELD OF THE INVENTION

The present invention relates to a system for autonomously setting up a watercraft race course, conducting a race and scoring the results.

SUMMARY OF THE INVENTION

An autonomous watercraft race course system for setting up, starting, conducting, and scoring a race. The race can be any type of race conducted on or near water. In a preferred embodiment the race is a sailing race, however, it is within the scope of this invention for the race to include races for power boats, personal water craft (i.e., jet ski), waterskiing, wake boarding or surfing and over water aircraft races.

The autonomous watercraft race course system includes at least one starting buoy programmable to autonomously travel to a starting line waypoint of a race course. The starting line waypoint is transmitted from a buoy command interface to a buoy computer on at least one starting buoy. The buoy computer of the at least one starting buoy also wirelessly transmits starting line wind direction data obtained from a wind direction sensor on the at least one starting buoy, the purpose of which is described in greater detail below. The autonomous watercraft race course system also includes at least one turn buoy programmable to autonomously travel to a turn waypoint of the race course. The turn waypoint is transmitted from a buoy command interface to a buoy computer on the at least one turn buoy. The buoy computer of the at least one turn buoy also wirelessly transmits starting line wind direction data obtained from a wind direction sensor on the at least one starting buoy, the purpose of which is described in greater detail below.

In addition to the buoys, there is also a host device operated by a host and a plurality of participant devices operated by one of a plurality of participants. The host device and the plurality of participant devices connect to the buoy command interface. The buoy command interface also wirelessly communicates to the buoy computer of the at least one starting buoy and the buoy computer of the at least one turn buoy.

Operating on the buoy command interface is a race course application that sets up the race course of a race, starts the race and scores the race. The race course application is activated by the host using the host device, where the host provides race parameters to the race course application. The race parameters include a desired distance of the race course and a desired number turns for the race course. Once the host enters the race parameters the race course application enters a race course setup mode and automatically obtains the starting line wind direction data, the turn wind direction data and generates the starting line waypoint and the turn waypoint. The starting line waypoint is transmitted to the buoy computer of the at least one starting buoy, and the turn waypoint is transmitted to the at least one turn buoy to complete the race course setup mode. The at least one starting buoy and the at least one turn buoy begin travelling to the respective waypoints that they receive.

Upon the completion of the race course setup mode the race course application then begins a race starting sequence mode. During the race starting sequence mode a timer is started on the race course application that counts down a predetermined number of seconds and sends a start notification to the host and the plurality of participants. Prior to the start notification the race starting sequence mode sends a countdown notification to the host and the plurality of participants that identifies how much time is remaining until the start notification is sent.

DETAILED DESCRIPTION

In the attached appendix are copies of U.S. Pat. Nos. 10,732,295 B1 and 9,927,529 B2, entitled "PROGRAMMABLE BUOY SYSTEM" issued to Matthew P. Morin and Kevin J. Morin, and U.S. Pat. No. 10,732,295 B1 entitled "PROGRAMMABLE BUOY SYSTEM" issued to Matthew P. Morin and Kevin J. Morin both contain descriptions of autonomous buoys that are used in connection with this invention, the entire contents of these applications are hereby incorporated by reference. The autonomous buoys in the present invention have additional components and implement a buoy command interface with race course application that is more robust than previous and involves additional features not disclosed by the attached patents.

The present invention is directed to an autonomous watercraft race course system 10 for setting up, conducting, and scoring watercraft races along a navigational course. Examples of such races include but are not limited to sailing races, powerboat races, jet ski races, water ski and wake board courses.

Referring now to FIGS. 1-5 the different components of the autonomous watercraft race course system 10 are shown. The autonomous watercraft race course system 10 includes a plurality of buoys, which will be collectively referred to herein as buoys 12a, 12b, 13, however, they will also be referred to herein as starting buoys 12a, 12b and a turn buoy 13. While a two starting buoys 12a, 12b and one turn buoy 13 are shown it is within the scope of this invention for a greater or lesser number of buoys to be used depending on the application and type of race course being setup. Therefore, the terms "starting buoys" and "turn buoy" are not limiting with respect to number and are hereby defined to include both singular and plural usage throughout this application. The reason for this is that in sailing regattas the starting line can have two buoys, but sometimes there is a race committee boat or pier and just one buoy is used. Also, some races have a single turn buoy, while others have two or more turns so more turn buoys are used.

Figure 2:
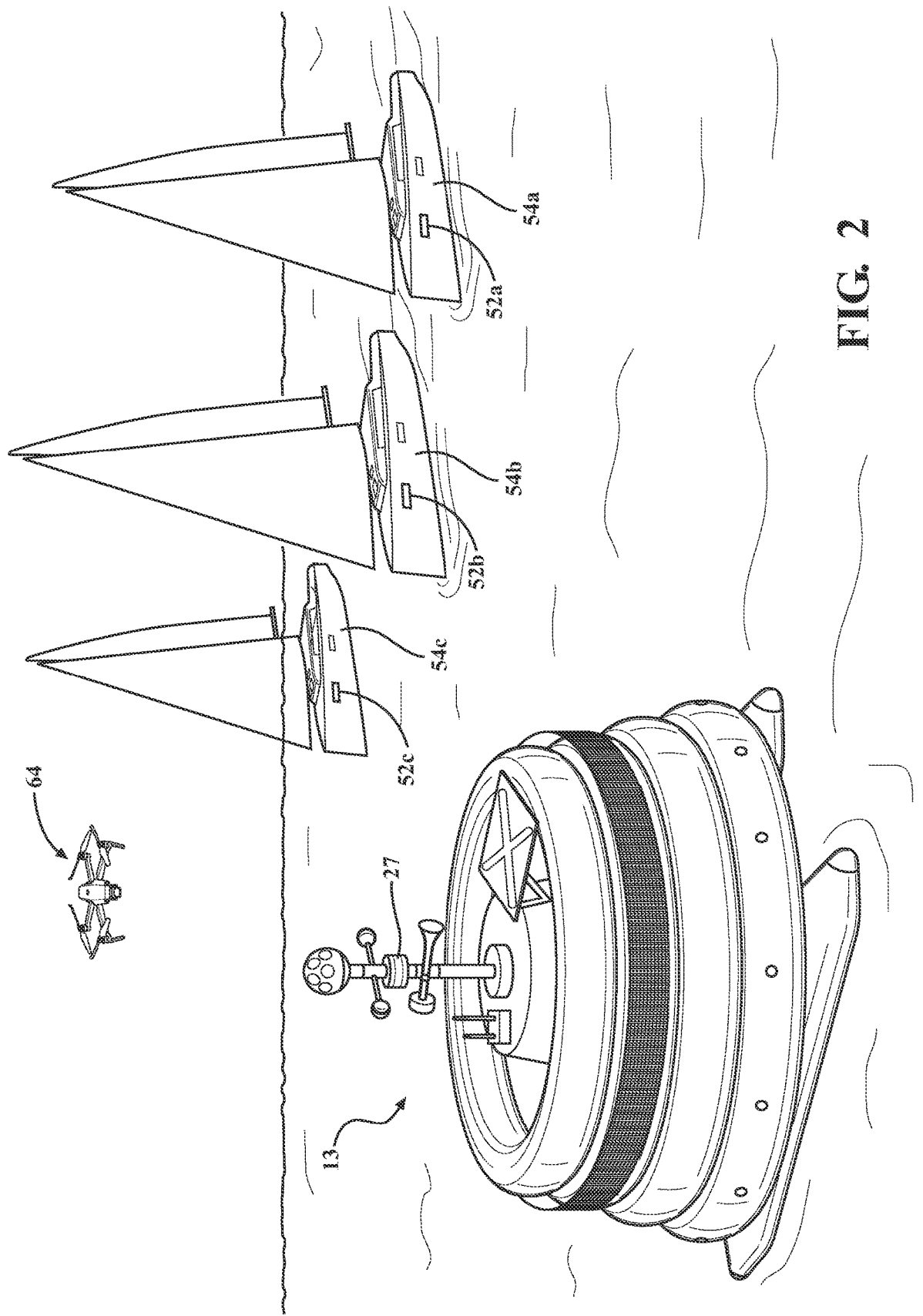
FIG. 2 is an illustrative view of the turn buoy with the participant watercraft approaching.
Figure 3:
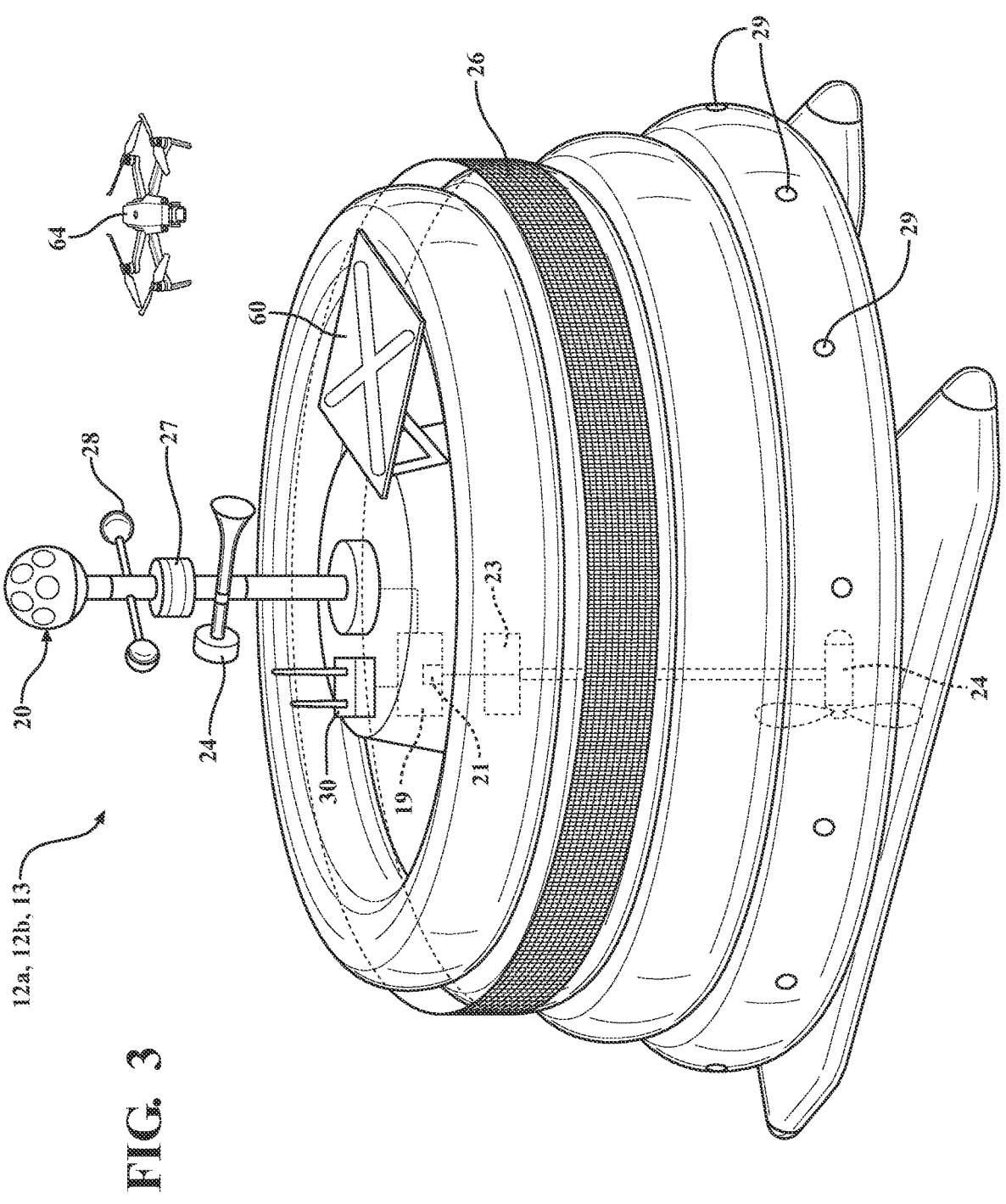
FIG. 3 is a side perspective view of a starting buoy or turn buoy with a drone and drone landing pad.

The autonomous watercraft race course system 10 in a preferred embodiment uses a number of buoys that have the same standard equipment and during the processes of setting up a race course 16, each individual buoy is designated to be the starting buoy or the turn buoy depending on the commands received from a buoy command interface 32, which be described in greater detail below. The details of the starting buoys 12a, 12b and turn buoy 13 are shown in FIG. 3, with additional reference to FIGS. 1 and 2-6. The starting buoys 12a, 12b and the turn buoy 13 each include a buoy computer 19 mounted thereon that wirelessly communicates with the buoy command interface 32. The wireless communication can be any type of communication such as wi-fi, cellular networks connections, satellite connections, radio wave connections between the buoy computer 19 and the buoy command interface 32. The buoy command interface 32 in one embodiment is a webpage operating on the Internet, however, it is possible for the buoy command interface 32 to reside more locally, such as on a host device 23.

Figure 4:
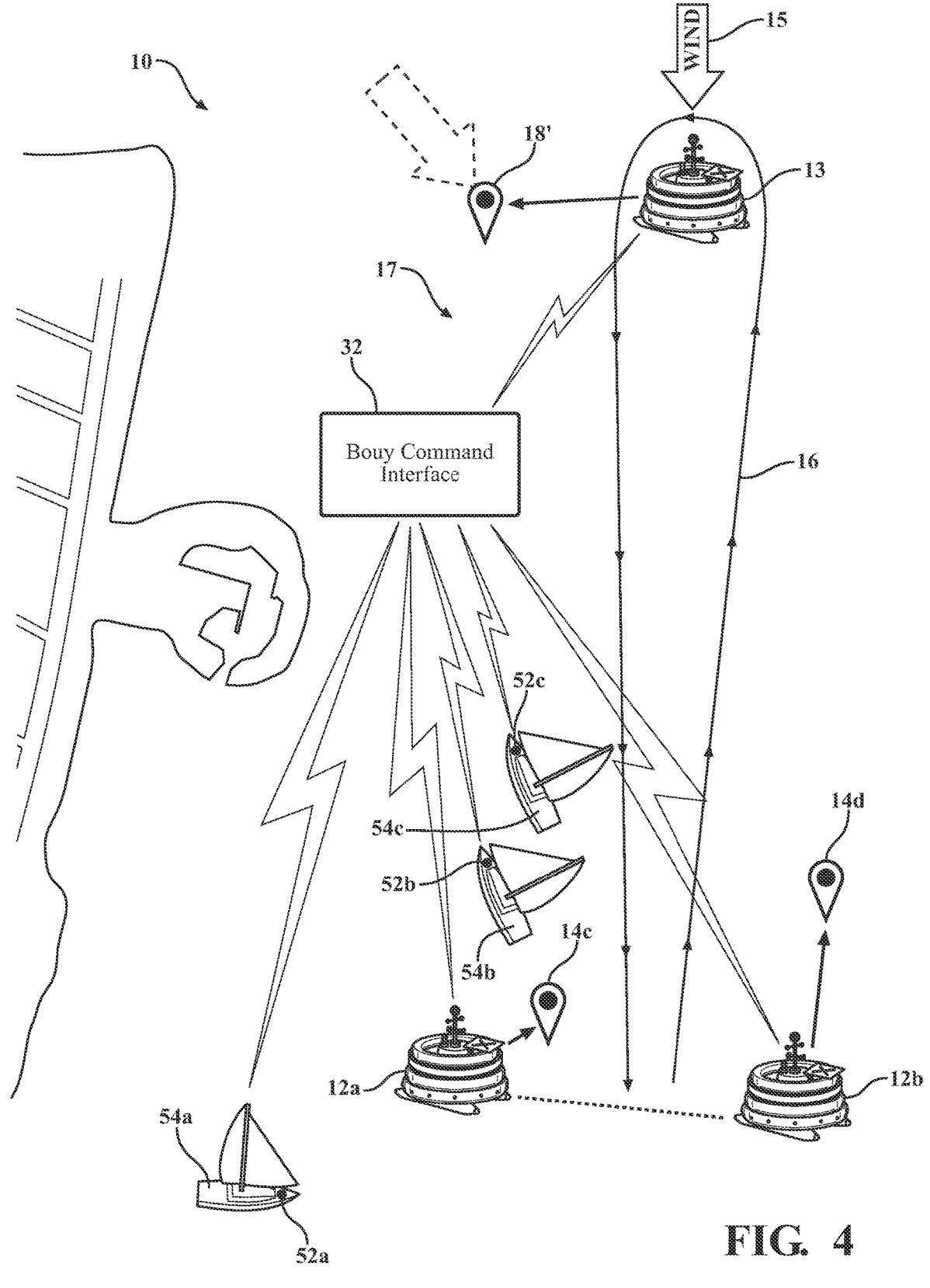
FIG. 4 is a schematic diagram showing the race course and a new race course.

As shown in FIG. 3, the starting buoys 12a, 12b and turn buoy 13 include several instruments and hardware components that are controlled by and send data to the buoy computer 19, which also sends data onto the buoy command interface 32. As shown the starting buoys 12a, 12b and turn buoy 13 include a wind direction sensor 20 that generates starting line wind direction data, indicating the wind direction at the starting buoys 12a, 12b and turn wind direction data that indicates the wind direction at the turn buoy 13. The wind direction sensor 20 can be an ultrasonic sensor or a mechanical telltale. The wind direction is important for sailing races in particular because the design of the race course 16 can depend on the direction of the wind, which often changes throughout the day, therefore the race course might have to be adjusted. For example, FIG. 4 shows the race course 16 with arrows indicating the general direction or course that watercraft 54, 54b, 54c participating in a race 17 sail around the turn buoy 13. In this particular embodiment the turn buoy 13 is positioned so that the watercraft 54a, 54b, 54c must sail against the wind, which is schematically indicated by a wind direction arrow 15.

Figure 1:
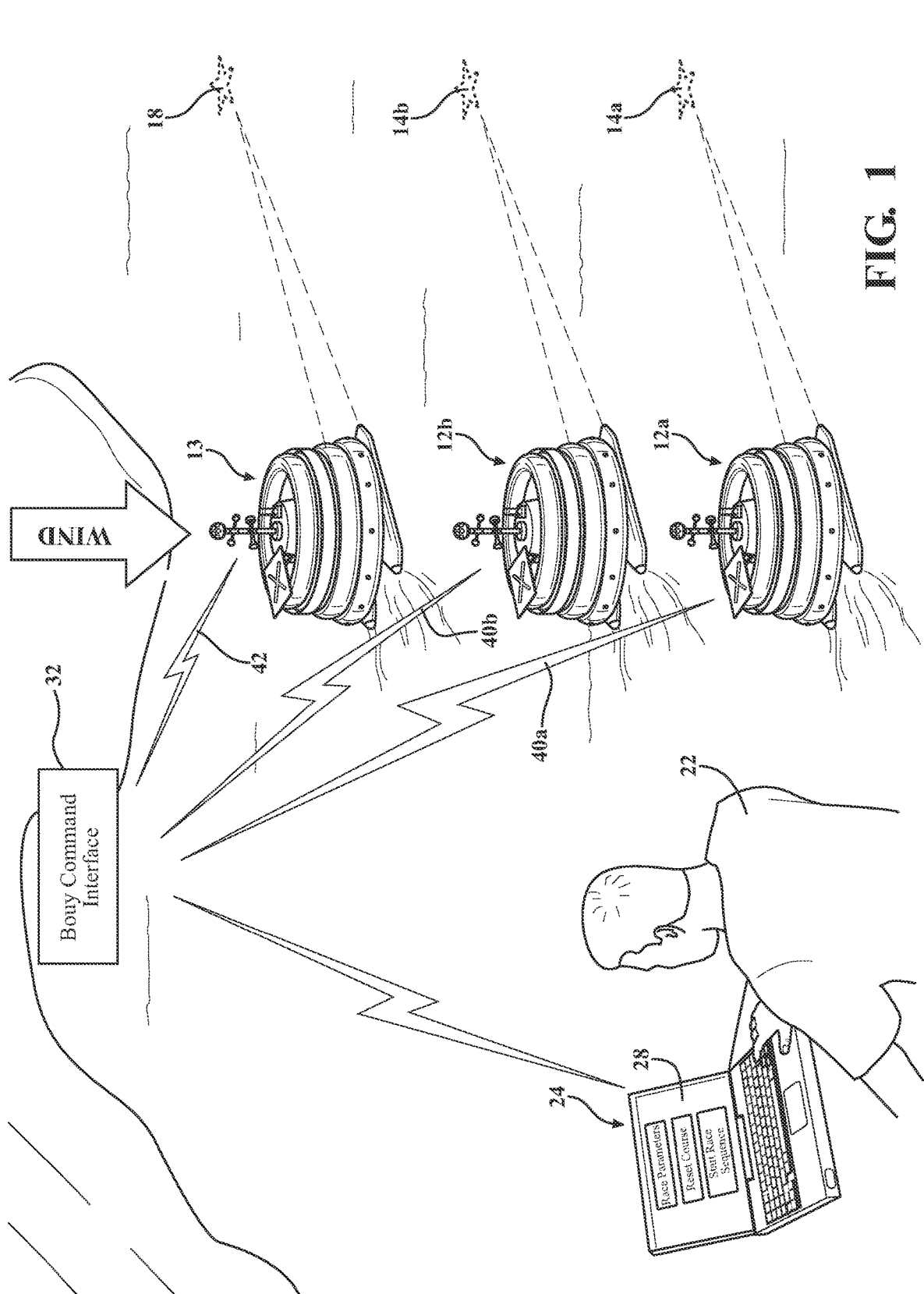
FIG. 1 is a schematic diagram of the buoys and the host device.

Referring back to FIG. 3 the starting buoys 12a, 12b and turn buoy 13 also include a motor 22 that is pivotable to steer and propel the buoy through the water. The buoy computer 19 further includes a navigational application that communicates with a steering and propulsion controller 21 to control the steering controller 23 controls the steering and propulsion of the motor 22 to a designated location. The navigation application includes but is not limited to a global positioning system communication that receives coordinates from satellites or radio positioning signals. As shown in FIGS. 1 and 4, the starting buoys 12a, 12b are programmable to autonomously travel to individual a starting line waypoints 14a, 14b of a race course 16 of a race 17. The turn buoy 13 is programmable to autonomously travel to a turn waypoint 18 of the race course 16. The starting line waypoints 14a, 14b and the turn waypoint 18 in one embodiment of the invention are latitude and longitude coordinates that are sent from the buoy command interface 32 to the buoy computer 19, which then utilizes the steering controller 23, propulsion controller 21 and motor 22 to steer the respective starting buoys 12a, 12b or turn buoy 13 to the waypoint.

The starting buoys 12a, 12b and turn buoy 13 also optionally include a camera 27 that sends visual images that are live streamed, recorded and replayed through the buoy command interface 32 either directly or through the buoy computer 19. For example, FIG. 2 shows the turn buoy 13 with a camera 27 that recording approaching watercraft 54a, 54b, 54c. The camera 27 is a three hundred sixty degree digital camera, however it is within the scope of the invention for there to be multiple cameras depending on the need of a particular application. Operating on the buoy command interface 32 is a race course application 34, the operation of which will be described in greater detail below. In another aspect of the images transmitted by the camera 27 can be analyzed by the race course application 34 which will be described later.

The starting buoys 12a, 12b and turn buoy 13 further include a sound device 24 and an optional display screen 26. The sound device 24 can be an air horn or a speaker that is controlled command from the buoy computer 19 and the display screen 26 is controlled by the buoy computer 19 and includes a screen that is used to show visual messages or views from the camera 27. The messages that appear on the display screen 26 or audible messages from the sound device 24 include message regarding countdown sequences, start notification, finish notification, race event notifications that include line violations and change of race course notifications, all of which will be described in greater detail below. The buoys 12a, 12b, 13 also optionally include lights 29 about the perimeter that can flash, stay on steady and have various colors. The lights 29 are used for navigation purposes according to local boating laws but is it also possible to use the lights 29 to signal when the buoys 12a, 12b, 13 are moving and to send signals regarding the race 17.

Also connected to the starting buoys 12a, 12b and turn buoy 13 is a wind speed sensor 28 that sends wind speed data to the buoy command interface 32 directly or through the buoy computer 19. Additionally, the buoys 12a, 12b, 13 include an antenna 30 connected to the buoy computer 19 to send and receive messages to both the buoy command interface 32 that is used to send and receive signals with the buoy command interface 32, host device 23 and participant devices 31, 31'. The antenna 30 is also able to transmit audio messages over marine radio (VHF) channels that are controlled by the buoy computer 19. The audio messages include message regarding countdown sequences, start notification, finish notification, line violations and change of race course notifications, all of which will be described in greater detail below.

As used herein the term "host" refers to an individual or organization that operates the buoys, inputs the race parameters, and conducts the race using the autonomous watercraft race course system 10. The terms "participant" or "participants" refer to individuals, which can also include the host, that are participating in a race that is created and conducted using the autonomous watercraft race course system 10. Additionally, the term "host device" is the device used by the host and the term "participant device" is the device used by participants in the race, which can also include the host device where a host is also a participant in the race.

Figure 5:
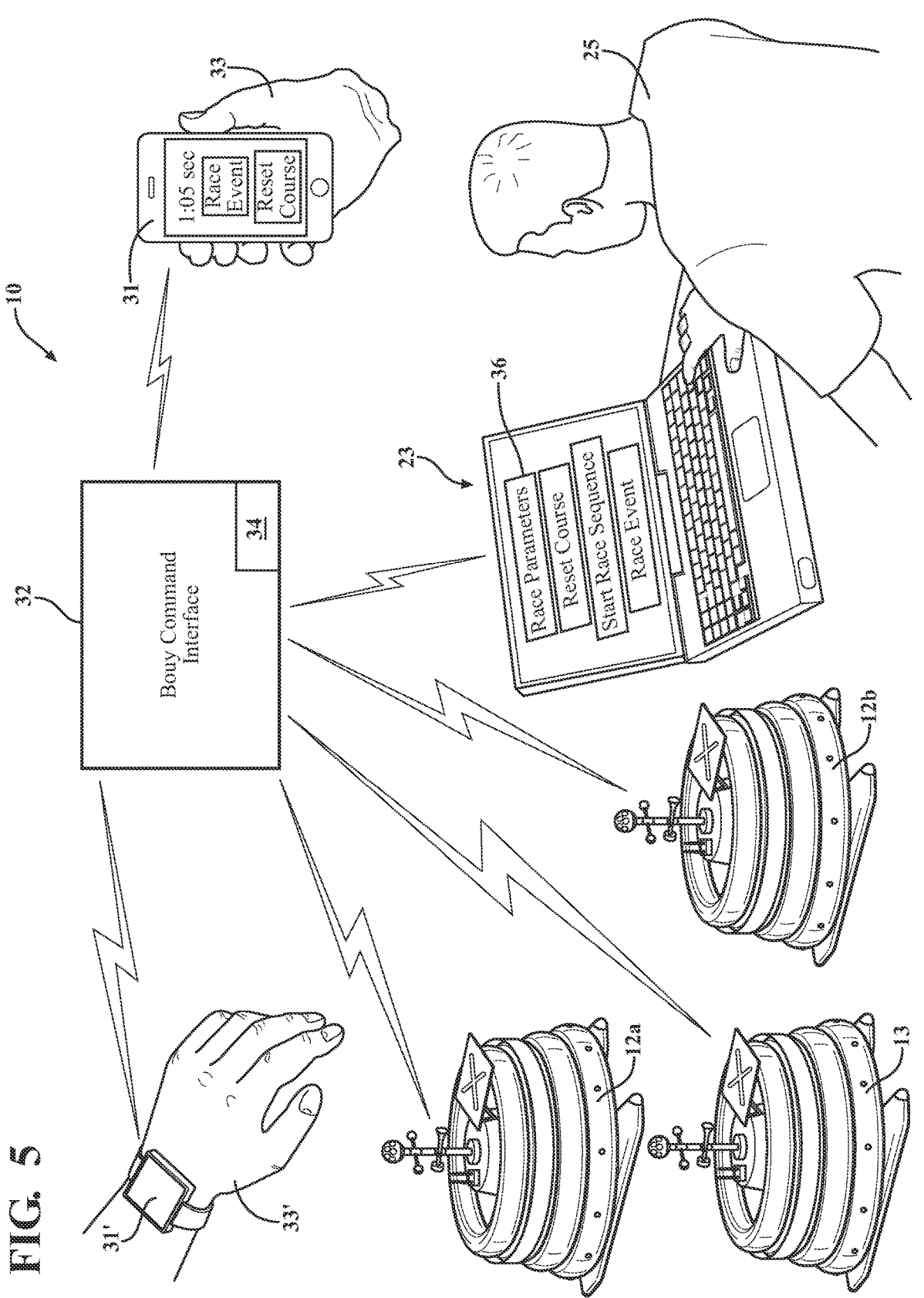
FIG. 5 is a schematic diagram outlining the autonomous watercraft race course system's different communication signals and hardware interactions.

Referring now to FIG. 5, the autonomous watercraft race course system 10 further includes the host device 23 that is operated by a host 25 and the participant devices 31, 31' operated by participants 33, 33'. It is possible that the host 25 could also be participating the in the race, therefore the host 25 could also be a participant and the host device 23 could further be included as a participant device. The host device 23 is a personal computer, tablet, smart phone, smart watch, or other suitable device for communicating with the buoy command interface 32. Similarly, the participant devices 31, 31' are a personal computer, tablet, smart phone, smart watch, or other suitable device for communicating with the buoy command interface 32 that is operated by the participant. The functionality of the participant devices 31, 31' with the buoy command interface 32 can be limited to prevent the participant from directly commanding the buoys, starting, and scoring races. However, it is within the scope of this invention for the host 25 using the host device 23 be able to delegate a particular one of the participant devices 31, 31' to have host privileges, if for example the host 25 cannot participate in or conduct races, but other participants wish to continue having races. This way the host 25 does not have to give the host device 23 to a particular participant, but rather a non-host participant can be made a new host through the setting on the buoy command interface 32.

The buoy command interface 32 is wirelessly connected to the host device 23, the participant devices 31, 31', and the buoy computer 19 of the starting buoys 12a, 12b and the turn buoy 13. The wireless connection is any suitable connection and can include a cellular, Bluetooth, wi-fi, satellite or radio communication system. The host device 23 and the participant devices 31, 31' are one or more from the group comprising a personal computer, laptop, smartphone, smartwatch, and tablet. The buoy command interface 32 can take many forms, but in one embodiment of the invention the buoy command interface is a website on the Internet that is used by the host 25 to create a personal account and register buoys to the host 25. The participants 33, 33' also interact with the buoy command server 32 to create an account so they can register for races, register their watercraft, watch race footage, cast votes, and be associated with the host 25 and the buoys that are assigned to the host 25. The buoy command interface 32 is also sends and receives commands, information, and other data from the host device 23, participant devices 31, 31' and buoy computer 19. The buoy command interface 32 can also be a program that is not located on the internet and is operating on the host device 23 with wireless communication between the host device 23, participant devices 31, 31' and the buoy computer 19, where the wireless communication can be enhanced or provided for by the antenna 30 or other signal enhancing device.

Figure 6:
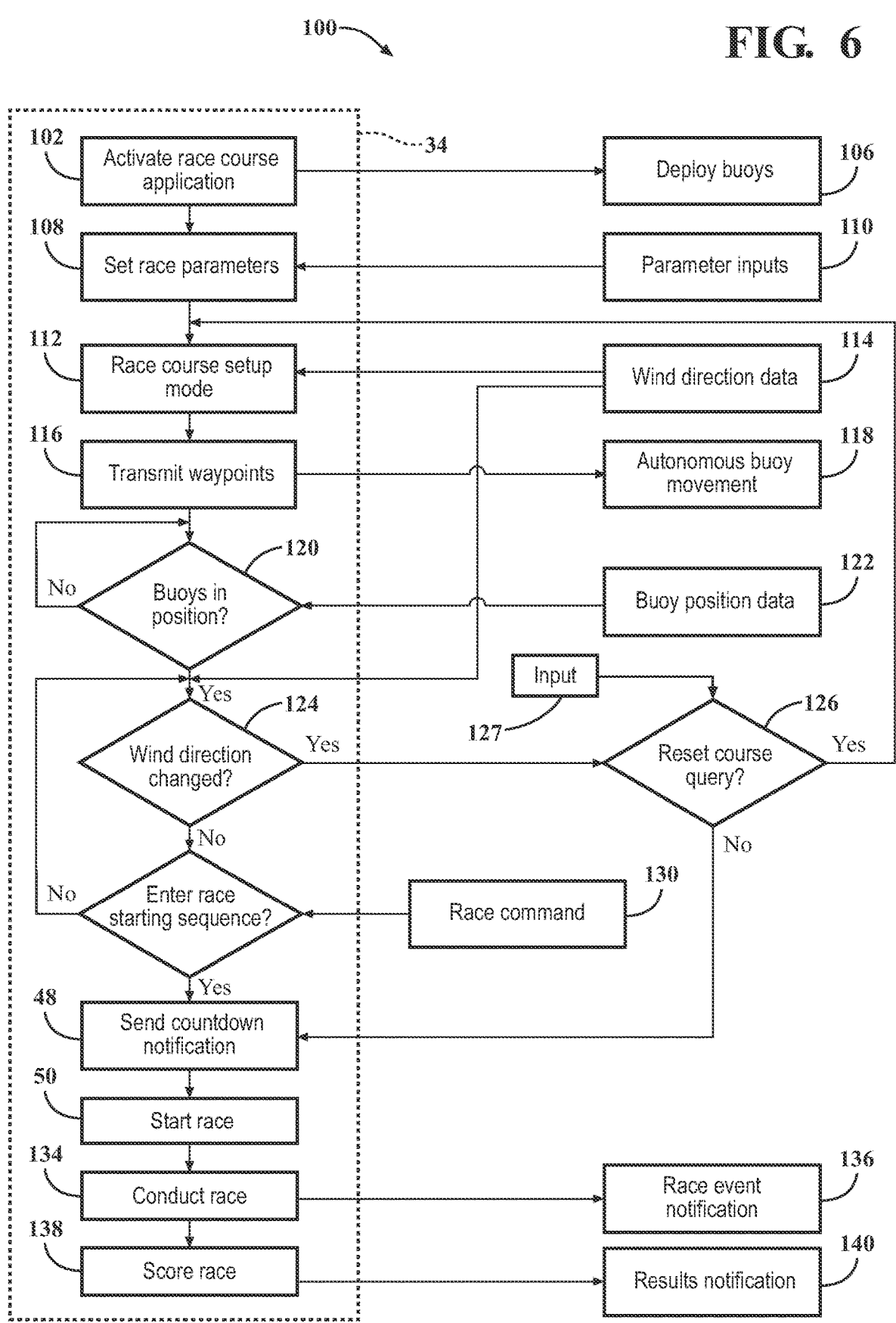
FIG. 6 is a flow diagram showing the method of conducting a race using an autonomous watercraft race course system.

Referring now to FIGS. 4-6, operating on the buoy command interface 32 is a race course application 34 that sets up the race course 16 of the race 17, starts the race 17 and scores the race 17. The race course application 34 is activated by the host 25 using the host device 23 communicating through the buoy command interface 32. The host 25 inputs race parameters 36 that include a desired distance of the race course 16 and a desired number turns for the race course 36. The buoy command interface 32 and the race course application 34 implement artificial intelligence wherein upon receipt of the race parameters 36 from the host device 23 the race course application 34 autonomously starts the race, autonomously conducts the race by determining race events and sending notifications of race events (discussed in greater detail below), and autonomously scores the race without any further input from the host device 23 and the plurality of participant devices 31, 31'.

Next the race course application 34 enters a race course setup mode 112 and automatically obtains wind direction data 114 that includes starting line wind direction data and a turn wind direction data from the wind direction sensor 20 of the respective starting buoys 12a, 12b and the turn buoy 13. The race course application 34 then determines and generates the starting line waypoints 14a, 14b that are transmitted to the buoy computer 19 of the starting buoys 12a, 12b. The race course application 34 further determines and generates the turn waypoint 18 that is transmitted to the buoy computer 19 of the turn buoy 13 to complete the race course setup mode 112.

Upon the completion of the race course setup mode 112, an enter race starting sequence mode 128 of the race course application 34 is activated and starts a timer 46 on the race course application 34 that counts down a predetermined number of seconds and sends a countdown notification 48 to the host 25 and the participants 33, 33'. The countdown notification 48 includes a notice sent to the host 25 and the participants 33, 33' that include an audio or visual notification of the beginning of a countdown period until a start notification 50 is sent that coincides with the timer 46 counting down to zero or some other predetermined time. The countdown notification 48 can include transmission of the timer 46 as it counts down or it can be a signal (audio or visual) that indicates the timer has started and the participants 33, 33' must keep track of the amount of time until the start notification 50. The countdown notification 48 and the start notification 50 can be any suitable way of communicating with the host 25 and the participants 33, 33'. This includes an audible countdown or horn sound broadcast from the sound device 24 on the buoys or a visual countdown and start message on the display screen 26 on the buoys 12a, 12b, 13. The countdown notification 48 can also be a timer broadcast to the host device 23 and participant devices 31, 31' or the timer can be a computer generated voice countdown or start message broadcast to radios of the host 25 and participants 33, 33', using the antenna 30 on each of the buoys 12a, 12b, 13. In sailing regattas there typically is a time period (i.e., countdown in minutes or seconds) that is counted down before the start notification 50 is given.

Referring to FIG. 4, the autonomous watercraft race course system 10 further includes location transmitters 52a, 52b, 52c capable of wirelessly transmitting a location signal to the buoy command interface 32. Each of the location transmitters 52a, 52b, 52c is mounted on the watercraft 54a, 54b, 54c participating in the race 16. Each of the watercraft 54a, 54b, 54c are operated by one of the participants 33, 33', which can also include the host 25. The invention is not limited to one specific type of location transmitters 52a, 52b, 52c however, in one embodiment of the invention the location transmitters 52a, 52b, 52c are global positioning system transmitters; however, one suitable example of a transmitter is a specialized GPS transmitter manufactured by TracTrac (https://www.tractrac.com/). Additionally, it is possible for the location transmitters to not use GPS technology and instead be a proximity sensor such as a visual sensor. In a preferred embodiment of the invention where the location transmitters 52a, 52b, 52c are global positioning system transmitters that relay location coordinates of the watercraft 54a, 54b, 54c to the race course application 34 for scoring the race and determining if one or more race events has occurred. The term "race events" as used herein include occurrences such as starting line over violations, finish line disputes, collisions between watercraft 54a, 54b, 54c, collisions with the buoys 12a, 12b, 13, proximity violations such as watercraft 54a, 54b, 54c not following proper conduct such as regatta rules concerning spacing around buoys 12a, 12b, 13, windward, leeward, and starboard wind violations. The detection of race events can be accomplished using the location transmitters 52a, 52b, 52c or they can be determined using other components of the autonomous watercraft race course system 10. For example, it is also within the scope of the invention for the race course application 34 to analyze the camera footage images on the buoys 12a, 12b, 13 to determine if a race event has occurred. Race events include collisions, starting line, finish line disputes or turning violations. The race course application 34 determines if a race event has occurred by employing artificial intelligence to review the images captured by the camera on the buoys 12a, 12b, 13 or the drone and determine if there were any collisions between watercraft and between buoys 12a, 12b, 13 and watercraft. The race course application 34 also analyzes the images captured by the camera to determine which watercraft crossed the finish line first or if any watercraft are over the starting line at the beginning of the race. This analysis involves determining the location of the start line or finish line and then examining the images to determine watercraft placement with respect to the start line or finish line at a given point in time during the race. Additionally at the turn buoy 13 the images captured by the camera are analyzed to determine if there were any spacing violations between the watercraft at the turn. This involves determining the number of boat lengths between boats and identifying any violations.

During the race starting sequence mode 128 the race course application 34 continuously collects and analyzes the starting line wind direction data 40a, 40b using the wind direction sensor 20 of the starting buoys 12a, 12b and the turn wind direction data 42 using the wind direction sensor 20 of the turn buoy 13. The race course application 34 automatically generates a reset course query event 126 if the starting line wind direction data 40a, 40b at the starting buoys 12a, 12b or the turn wind direction data 42 at the at turn buoy 13 has changed by a certain amount depending on the parameters programmed into the race course application 34. For example, a reset course query event 126 might only be triggered if the starting line wind direction data 40a, 40b and the turn wind direction data 42 changes only by a certain degree such as five or ten degrees from the original data readings. It is within the scope of this invention for the degree of variation to be adjusted depending on the particular application. During the reset course query event 126 a new course decision notification is presented to the host device 23 and the host will input a decision is made whether a new course setup should occur or if the race starting sequence mode 128 will continue. In an alternate embodiment of the invention the reset course query event 126 the new course decision notification is sent to the host device 23 and the participant devices 31, 31', where the host 25 and the participants 33, 33' will cast a vote that is transmitted back to and tallied by the race course application 34, which depending on the results of the tally will determine if the race starting sequence mode 128 will continue.

If during the reset course query event 126 a new course setup is selected a new race starting sequence begins and the race course application 34 will return to the race course setup mode at the step 112 and calculate a new race course where one of the at least one starting buoys 12a, 12b will be directed to a new starting line waypoint 14c, 14d and the turn buoy 13 will be directed to a new turn waypoint 18'. The race course application 34 through the buoy command interface 32 transmits a reset message concerning the reset course query event 126 to the host device 23 and the participant devices 31, 31'. The reset message informs the host and the participants 33, 33' of the new starting waypoint 14c, 14d and the new turn waypoint 18'.

In another aspect of the invention the method 100 the reset course query event 126 is autonomously determined by the race course application 34. The race course application 34 is programmed to automatically begin a new course setup and return to the race course setup mode at step 112 if the wind direction data indicates that the wind has changed by a pre-programmed amount, thereby eliminating the need for any inputs from the host and participants 33, 33' and further enhancing the artificial intelligence aspect of the autonomous watercraft race course system 10.

In yet another alternate embodiment of the invention shown in FIG. 3, the buoys 12a, 12b, 13 optionally have a landing pad 60 mounted thereon that is configured to receive and hold a drone 64, that in one embodiment is an aerial flying drone. It is within the scope of this invention for the drone 64 to be some other type of drone such as watercraft. The drone 64 has a camera and can be operated wirelessly the by the race course application 34, which can be programmed to activate the drone 64 when the location transmitters 52a, 52b, 52c and the watercraft 54a, 54b, 54c come within a certain proximity to one of the buoys 12a, 12b, 13. The camera on the drone 64 allows the autonomous watercraft race course system 10 to capture an aerial view of the watercraft 54a, 54b, 54c when they are near the buoys 12a, 12b, 13. The footage taken from the camera on the drone 64 can be analyzed by the race course application 34 to determine if any race events have occurred.

Referring now to FIG. 6 a method 100 of conducting a race using the autonomous watercraft race course system 10 is now described according to one method of the invention. The method 100 takes a number of inputs from the host 25, participants 33, 33' and environmental data from the buoys 12a, 12b, 13 to formulate the race course 16 and new race course 16' and then autonomously setup the race course 16 or new race course 16' by commanding the buoys 12a, 12b, 13 to move into position.

The method 100 includes providing all of the components and data described above with respect to the other Figs. More specifically referring now to FIG. 3 the method 100 includes providing buoys 12a, 12b, 13 that are programmable to autonomously travel on a body of water as described above. The buoys 12a, 12b, 13 are configured to wirelessly receive commands and wirelessly transmit wind direction data obtained from the wind direction sensor 20 on each of the buoys 12a, 12b, 13. The method further includes providing the host device 23 operated by the host 25 and participant devices 31, 31' operated by one of the plurality of participants 33, 33'.

Referring to FIGS. 4 and 6, the method 100 also includes providing a buoy command interface 32 wirelessly connected to the host device 32, the plurality of participant devices 31, 31' and the buoy computer 19 of the starting buoys 12a, 12b and the turn buoy 13.

The method 100 further includes providing the race course application 34 operating on the buoy command interface 32 that sets up the race course 16 and the new race course 16' of the race 17. The race course application 34 also starts the race 17, conducts the race 17 and scores the race 17.

Referring now to FIG. 6 the method 100 beings with the step 102 of activating the race course application 34 by the host using the host device to send an activation command 104. At a step 106 of deploying the buoys 12a, 12b, 13 occurs. The step 106 can be automated in embodiments where the buoys 12a, 12b, 13 are connected to a station or by a person placing the buoys 12a, 12b, 13 in the body of water and turning them on to connect with the buoy command interface 32.

The race course application 34 performs a step 108 of setting the race parameters 110 from the host 25 using the host device 23 and then at a step 112 the race course application 34 enters the race course setup mode. The race parameter inputs include the number of turns and the length of the race course. During the race course setup mode wind direction data 114 is continuously transmitted and received from the buoys 12a, 12b, 13, and the race course application 34 automatically determines the turn waypoint 18 and a starting line waypoints 14a, 14b. Also, during the step 112 race course setup mode the race course application 34 assigns each of the buoys 12a, 12b, 13 to be the turn buoy 13 or the starting buoys 12a, 12b.

Next at a step 116 the race course application 34 and buoy command interface 32 transmit the turn waypoint 18 to the turn buoy 13 and the starting line waypoints 14a, 14b to the respective starting line buoys 12a, 12b. The buoys 12a, 12b, 13 receive their respective starting line waypoints 14a, 14b and turn waypoint 18, and then begin at step 118 of autonomously moving the turn buoy 13 to the turn waypoint 18 and the starting line buoys 12a, 12b to the starting line waypoint 14a, 14b respectively.

The method 100 further includes a step 120 where the race course application 34 determines if the buoys 12a, 12b, 13 are in position at their assigned waypoints. The step 120 analyzes buoy position data 122 transmitted from the buoys 12a, 12b, 13 that includes the current coordinates of the buoys 12a, 12b, 13. During the step 120 the race course application 34 compares the current coordinate of each buoy 12a, 12b, 13 to the waypoint transmitted to the respective buoy during the step 116. If at step 120 the buoys are determined to not be in position the step 120 will repeat until the buoys 12a, 12b, 13 are at their assigned waypoint.

Once the buoys 12a, 12b, 13 are determined to be at their assigned waypoint the race course application 34 conducts a step 124 and a determination is made whether the wind direction at the buoys 12a, 12b, 13 has changed based on the wind direction data 114. During the step 124 the race course application 34 will analyze the wind direction data 114 to see if the wind direction has changed since the step 112 of race course setup mode where the waypoints were set. If the wind direction has changed by a certain amount programmed into the race course application 34 a reset course query message 126 is sent to the host device 23 and participant devices 31, 31' requesting a host and participant input 127. The host and participant input 127 in one embodiment can be fully controlled by an input from the host 25 using the host device 23, where the host will select whether the course should be reset. In another embodiment of the invention the host 25 will cast a vote using the host device 23 and each of the participants 33,33' will cast a vote using the participant devices 31, 31'. The vote is an indication of a preference of whether or not the race course 16 should be reset with a new race course 16' based on the current wind direction. The race course application 34 will tally the results of the host and participant input 127. If the results of the vote indicate the race course 16 will not change then the race course application 34 proceeds to send the countdown notification 48 as described above. If the results of the vote indicate that a new race course 16' is desired, then the race course application 34 proceeds back to the step 112 an starts the race course setup mode and the race course 16' which is a new race course based on current wind direction data is created.

If at the step 124 it is determined that the wind direction has not changed the race course application 34 will generate the enter race starting sequence mode 128 decision to the host device 34 and the host 25 will send a race command 130 to the race course application 34. The race command 130 is a yes or no input in response to the enter race starting sequence mode 128. If the race command 130 is no then the race course application 34 returns to step 124.

If the race command 130 is yes, the race course application 34 sends the countdown notification 48 to the host 25 and participants 33, 33' in the manner described above. Then after the timer 46 (described above) reaches zero (or some other pre-programmed period lapses) the start notification 50, which can take many forms as described above is given to the host 25 and the participants 33, 33'.

During a step 134 the race 17 is conducted and the race course application 34 monitors all inputs and generates different race event notifications 136 to the host 25 and participants 33, 33' that are alerts or messages regarding the occurrence of one or more race events as described above. At the step 138 the race course application 34 scores the race 17 and determines the different finishing times and placements for each of the participants 33, 33'. Determination of the ranking of each boat is made by using the location transmitters 52a, 52b, 52c on each watercraft 54a, 54b, 54c. Also, the buoy command interface 32 is capable of interfacing with and uploading the results of the race to other third party websites. This finish information is also sent to the host 25 and participants 33, 33' during a step 140 that includes results notification. The step 140 can be carried out using by sending messages to the host device and participant devices 31,31'. It is also possible to send messages using the antenna 30 to broadcast the results over a radio channel, visual display of the results on the display screen 26 and audio announcement of the results using the sound device 24.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

What is claimed is:

1. An autonomous watercraft race course system comprising:

at least one starting buoy programmable to autonomously travel to a starting line waypoint of a race course that is received by a buoy computer on the at least one starting buoy, wherein the buoy computer also wirelessly transmits starting line wind direction data obtained from a wind direction sensor on the at least one starting buoy;

at least one turn buoy programmable to autonomously travel to a turn waypoint of the race course, wherein the turn waypoint is a location of the at least one turn buoy that a watercraft needs to travel to and turn around during a race, the turn waypoint is received by a buoy computer on the at least one turn buoy, wherein the buoy computer also wirelessly transmits turn wind direction data obtained from a wind direction sensor on the at least one turn buoy;

a host device operated by a host;

a plurality of participant devices are operated by at least one of a plurality of participants;

a buoy command interface wirelessly connected to the host device, the plurality of participant devices, the buoy computer of the at least one starting buoy and the buoy computer of the at least one turn buoy;

a race course application operating on the buoy command interface that autonomously sets up the race course of a race, autonomously starts the race and autonomously scores the race, wherein the race course application is activated by the host using the host device, wherein the host provides race parameters that include a desired distance of the race course and a desired number of turns for the race course, the race course application then enters a race course setup mode and automatically obtains the starting line wind direction data, the turn wind direction data and determines the starting line waypoint that is transmitted to the buoy computer of the at least one starting buoy and the turn waypoint that is transmitted to the at least one turn buoy to complete the race course setup mode; and wherein upon the completion of the race course setup mode, the race course application automatically enters a race starting sequence mode and starts a timer on the race course application that counts down a predetermined number of seconds and automatically sends a start notification to the host and the plurality of participants, wherein prior to the start notification the race starting sequence mode automatically sends a countdown notification to the host and the plurality of participants.

2. The autonomous watercraft race course system of claim 1 further comprising:

a plurality of location transmitters capable of wirelessly transmitting a location signal to the buoy command interface, wherein each one of the plurality of location transmitters is mounted on one of a plurality of watercraft each being operated by one of the plurality of participants participating in the race, wherein the race course application reads the location signal to determine if one or more race events has occurred.

3. The autonomous watercraft race course system of claim 2, wherein one of the plurality of participants includes the host.

4. The autonomous watercraft race course system of claim 2, wherein the one or more race events include starting line violations, collisions, and finish line places.

5. The autonomous watercraft race course system of claim 2, wherein the race course application automatically sends a race event notification to the host and the plurality of participants.

6. The autonomous watercraft race course system of claim 1 further comprising:

the at least one starting buoy has a motor for propelling the at least one starting buoy through a body of water, a steering controller, and a global positioning controller;

the at least one turn buoy has a motor for propelling the at least one turn buoy through a body of water, a steering controller, and a global positioning controller; and wherein upon receipt of the starting line waypoint by the buoy computer of the at least one starting buoy or the turn waypoint by the buoy computer of the at least one turn buoy automatically activates and controls the motor, the steering controller, and the global positioning controller to autonomously move the at least one starting buoy to the starting line waypoint and the at least one turn buoy to the turn waypoint.

7. The autonomous watercraft race course system of claim 1, wherein during the race starting sequence mode the race course application continuously collects and analyzes the starting line wind direction data using the wind direction sensor of the at least one starting buoy and the turn wind direction data using the wind direction sensor of the at least one turn buoy and the race course application automatically generates a reset course query event if the starting line wind direction data at the at least one starting buoy or the turn wind direction data at the at least one turn buoy has changed, wherein during the reset course query event a new course decision notification is transmitted to the host device and a decision is made whether a new course setup should occur or if the race starting sequence mode will continue;

wherein upon selection of the new course setup a new race course setup mode begins and the race course application calculates a new race course where one of the at least one starting buoy will be directed to a new starting waypoint and the at least one turn buoy will be directed to a new turn waypoint of the new race course, wherein the new turn waypoint is a location of the at least one turn buoy that a watercraft needs to travel to and turn around during the new race course, and the race course application transmits through the buoy command interface, a reset message concerning the reset course query event to the host device and the plurality of participant devices where the reset message informs the host and the at least one participant of the new starting waypoint and the new turn waypoint.

8. The autonomous watercraft race course system of claim 7, wherein the new course decision notification involves sending a message to the host device and the at least one of the plurality of participant devices to conduct a vote, wherein the host and the at least one participant will cast a vote to the race course application using the host device and the at least one of the plurality of participant devices and the race course application will calculate the results of the vote and transmit a results message to the host device and the plurality of participant devices.

9. The autonomous watercraft race course system of claim 1 further comprising:

wherein the at least one turn buoy includes a wind speed sensor connected to the buoy computer of the at least one turn buoy that generates wind speed data that is wirelessly transmitted to the race course application, and wherein the at least one starting buoy includes a wind speed sensor connected to the buoy computer of the at least one starting buoy that generates wind speed data that is wirelessly transmitted to the race course application, wherein the wind speed data from the at least one starting buoy and the wind speed data from the at least one turn buoy is then transmitted to the host device and the at least one participant device.

10. The autonomous watercraft race course system of claim 1, wherein the host device and the plurality of participant devices are one or more from the group comprising a personal computer, laptop, smartphone, smartwatch, and tablet.

11. The autonomous watercraft race course system of claim 1, wherein the buoy command interface is a website on the Internet.

12. The autonomous watercraft race course system of claim 1, the buoy command interface is a program operating on the host device.

13. The autonomous watercraft race course system of claim 1, wherein the start notification and the countdown notification are audio sounds emitted from a sound device on the at least one starting buoy.

14. The autonomous watercraft race course system of claim 1, wherein the start notification and countdown notification further include a visual message on a display screen mounted to the at least one starting buoy.

15. The autonomous watercraft race course system of claim 1, wherein the at least one starting buoy and the at least one turn buoy further include a camera for sending visual images to the race course application, wherein the race course application records, replays the visual images through the buoy command interface.

16. The autonomous watercraft race course system of claim 15, wherein the race course application analyzes the images to determine if one or more race events has occurred.

17. The autonomous watercraft race course system of claim 1, wherein upon receipt of the race parameters from the host device the race course application autonomously starts the race and autonomously scores the race without any further input from the host device and the plurality of participant devices.

18. The autonomous watercraft race course system of claim 1 further comprising:

wherein during the race starting sequence mode the race course application continuously collects and analyzes the starting line wind direction data using the wind direction sensor of the at least one starting buoy and the turn wind direction data using the wind direction sensor of the at least one turn buoy and the race course application, and when the race course application determines that the starting line wind direction data at the at least one starting buoy or the turn wind direction data at the at least one turn buoy has changed by a predetermined amount programmed into the race course application, a new race course setup mode begins and the race course application calculates a new race course where one of the at least one starting buoy will be directed to a new starting waypoint of the new race course, wherein the new turn waypoint is a location of the at least one turn buoy that a watercraft needs to travel to and turn around during the new race course, and the at least one turn buoy will be directed to a new turn waypoint and the race course application transmits through the buoy command interface, a reset message concerning a reset course event to the host device and the plurality of participant devices where the reset message informs the host and the at least one participant of the new starting waypoint and the new turn waypoint.

19. A method of conducting a race using an autonomous watercraft race course system comprising the steps of:

providing a plurality of buoys programmable to autonomously travel on a body of water wherein the plurality of buoys are configured to wirelessly receive commands and wirelessly transmit wind direction data obtained from a wind direction sensor on each of the plurality of buoys;

providing a host device operated by a host and a plurality of participant devices operated by at least one of a plurality of participants;

providing a buoy command interface wirelessly connected to the host device, the plurality of participant devices, and a buoy computer on each of the plurality of buoys;

providing a race course application operating on the buoy command interface that sets up the race course of a race, starts the race and scores the race;

activating the race course application by the host using the host device to send an activation command;

deploying the plurality of buoys into the body of water;

setting race parameters in the race course application with parameter inputs from the host using the host device;

entering race course setup mode of the race course application, wherein wind direction data is continuously transmitted and received from the plurality of buoys and the race course application automatically determines a turn waypoint and a starting line waypoint, wherein the race course application assigns each of the plurality of buoys to be one of a turn buoy or a starting buoy, wherein the turn waypoint is a location of the turn buoy that a watercraft needs to travel to and turn around during a race;

transmitting the turn waypoint to the buoy computer of the turn buoy and the starting line waypoint to the buoy computer of the starting buoy by the race course application through the buoy command interface;

receiving the turn waypoint by the turn buoy and autonomously moving the turn buoy to the turn waypoint and receiving the starting line waypoint by the starting buoy and autonomously moving the starting buoy to the starting line waypoint;

transmitting a location data wirelessly from each of the turn buoy and the starting buoy to the race course application;

determining if the turn buoy has reached the turn waypoint and if the starting buoy has reached the starting line waypoint automatically using the race course application and the location data;

determining automatically by the race course application if the wind direction data from the starting buoy and the turn buoy has changed by a predetermined amount;

generating automatically by the race course application a race starting sequence mode decision to the host device that requests a race command from the host using the host device and upon receipt of a race command indicating a yes response, the race course application sends a countdown notification to the host device and the plurality of participant devices;

starting a timer on the race course application that counts down a time period till the race is to start; and transmitting a start notification to the host and participants.

20. The method of claim 19, wherein the race parameters include a number of turns on the race course and a length of the race course.

21. The method of claim 19 further comprising the steps of:

wherein if a determination is made that the wind direction data from the starting buoy and the turn buoy has changed by a predetermined amount that the race course application automatically generates and transmits a reset course query to the host device, and returning the race course application to the race course setup mode if a new race course is desired.

22. The method of claim 19 further comprising the steps of:

wherein if a determination is made that the wind direction data from the starting buoy and the turn buoy has changed by a predetermined amount that the race course application automatically generates and transmits a reset course query to the host device and the plurality of participant devices, which requests the host and the plurality of participants to provide a vote on whether a new course will be setup;

casting the vote by each of the host using the host device and the plurality of participants using one of the plurality of participant devices;

tallying each vote by the race course application to determine a vote result and automatically returning to the race course setup mode if the vote result determines that the new course will be setup.

* * * * *